United States Patent [19]
Slade

[11] 3,734,462
[45] May 22, 1973

[54] APPARATUS FOR SPREADING APART ELECTRIC POWER CABLE WIRES

[75] Inventor: Harry Boone Slade, Amherst, N.H.
[73] Assignee: Hendrix Wire and Cable Corp., Milford, N.H.
[22] Filed: Nov. 11, 1971
[21] Appl. No.: 197,740

[52] U.S. Cl. ...................................254/1, 174/146
[51] Int. Cl. .................................................B60p 1/00
[58] Field of Search....................29/203 H, 239, 240; 254/1, 104, 131, 10.5; 174/146; 267/61 S

[56] References Cited
UNITED STATES PATENTS

| | | | |
|---|---|---|---|
| 3,091,448 | 5/1963 | Kieffer | 267/61 S |
| 3,295,830 | 1/1967 | Bogese | 254/131 |
| 3,352,301 | 11/1967 | Abelson | 254/10.5 X |

Primary Examiner—Othell M. Simpson
Attorney—C. Yardley Chittick, Robert L. Thompson, Charles E. Pfund et al.

[57] ABSTRACT

Wedge-like, spiral threaded tool for separating wound together aerial electric power cable wires by inserting and rotating therebetween to spread the wires apart into a position in which they can be individually manipulated.

7 Claims, 3 Drawing Figures

PATENTED MAY 22 1973 3,734,462

APPARATUS AND METHOD FOR SPREADING APART ELECTRIC POWER CABLE WIRES

FIELD OF THE INVENTION

This invention relates generally to the secondary distribution of electric power, and more particularly to apparatus and method for manipulating secondary cable wires such as are strung or wound and tensioned together for aerial suspension from poles or the like.

BACKGROUND OF THE INVENTION

The problem is presented in the art here concerned of forcing the aerially installed messenger and phase conductor wires apart, as against the compressive or holding together forces by their wound together stringing and sagging, to enable the installation between said wires of cable wire hold-apart means, or cable separators, and to permit also the manipulating individually of the messenger and phase conductors of the secondary cable, as for the installation at any pole or mid span point therealong of service taps, or individual customers service drops.

This invention provides apparatus and method whereby to accomplish the described secondary cable spreadng.

The separating of aerial electric power cable wires has been accomplished heretofore, but not, so far as applicant is aware, by apparatus or method such as of this invention.

BRIEF SUMMARY OF THE INVENTION

The invention apparatus or tool provides a rigid body adapted to force and support or hold apart two or more cable wires passed over its opposite sides, and which is cable also of wedging and holding apart at least two cable wires engaged over its one side. The tool has one body portion adapted to be entered between the wound together cable wires, has an adjacent conical, spiral threaded portion by which the wires are forced apart upon rotation of the tool, and is adapted for the effecting of such rotation manually, or by manually manipulable torque means.

The invention method provides for the engaging and forcing apart of bundled secondary cable wires to individually workable separation by inserting wedging means therebetween and rotating and advancing such means to force and hold the cable wires apart.

BRIEF DESCRIPTION OF THE DRAWING

The invention will be fully understood by those skilled in the art from the specification taken together with the accompanying drawings in which.

DESCRIPTION OF THE PREFERRED EMBODIMENTS

Figure 1:
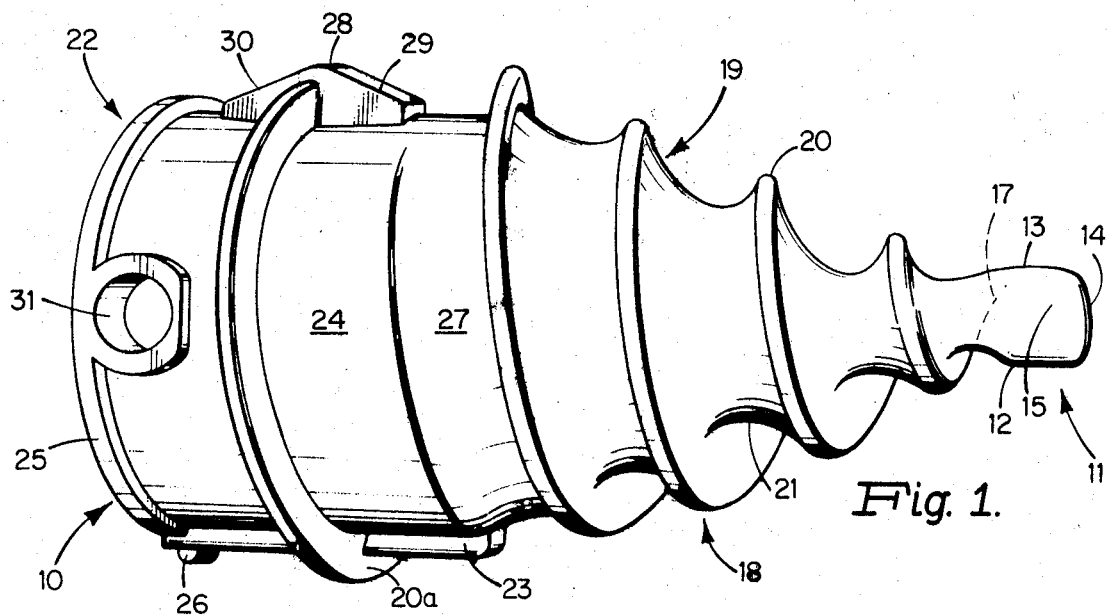
FIG. 1 is a side elevation view in upright position of one form of the invention tool.

The secondary cable spreading tool of the invention herein comprises a rigid hollow body 10 having generally a wedge form, or cone shape, and which is integrally molded of a material providing three wanted properties.

The tool or spreader body 10 has a crush-resistant strength to withstand the compressive forces exerted thereon by the aerial cable wire, in the course of its overcoming their stringing or sagging tensions to the extent needed to force the wires apart from their normal, would together condition to a separated condition permitting or simplifuing the installation of service taps and cable separators.

The spreader body material has a break-resistant strength to withstand impact upon, or such as renders its free from cracking or breaking upon, inadvertent or other dropping or fallng to the ground from the height of the secondary cable.

The spreader body material has, or is moldable or finishable with, a surface of such smooth or slippery or frictionless quality or condition as substantially prevents or avoids any abrading or wearing of the cable wire surfaces or insulations, upon the inserting and rotating and wedging of the tool between and for separating the wires.

One material preferred for the spreader body 10 as providing these wanted properties is a high impact strength type polystyrene. A high density type polyethylene is also found suitable, and most nylon and similar materials should meet the requirements.

The invention spreader tool may or may not be fashioned of a material which is also electrically insulating.

For entering between the cable wires the tool has a "bill" 11, or more particularly a wedge-form blade having narrow, vertical edges 12, 13, a thin, blunt, flat or rounded point or tip 14, one wide flat vertical side 15, and an opposite wide side 16 flaring or diverging from said tip 14 to a transverse ridge or rib extending thereacross.

Below its bill 11 the spreader has an intermediate spreading or separating section or portion 18 generally of a tapered, and more particularly of a conical, conformation.

The separating or wedging portion 18 of the spreader 10 is surfaced or outside formed with a downwardly and outwardly winding spiral thread 19 having a rounded crest 20 and a rounded root 21.

The crest 20 of the spiral thread 19 originates, or has its upper termination or uppermost turn at the bill 11 and as the transverse rib 17 spiral-extending across the flaring side 16 thereof. The upper termination or uppermost reach or turn of root 21 is seen to undercut rib 17 and, therebelow, to define the base of straight bill side 15, and indent bill edge 12.

Thread root 21 is a channel or groove with a radius exceeding that of the secondary cable wires with which the tool is designed for use, and the crest 20 and root 21 have a height and depth combining with the compressive or closing forces of the cable wires to prevent the wires from being pulled out of the root 21 so as unwantedly to slide or jump over the crest 20, subject to their biasing by the rotative manipulation of the invention tool.

The invention tool or spreader further comprises a basal or lowermost cable wire supporting and spacing section or body portion 22 adjacent or extending downwardly from wedge portion 18 and which is of generally annular and herein cylindrical form.

Figure 3:
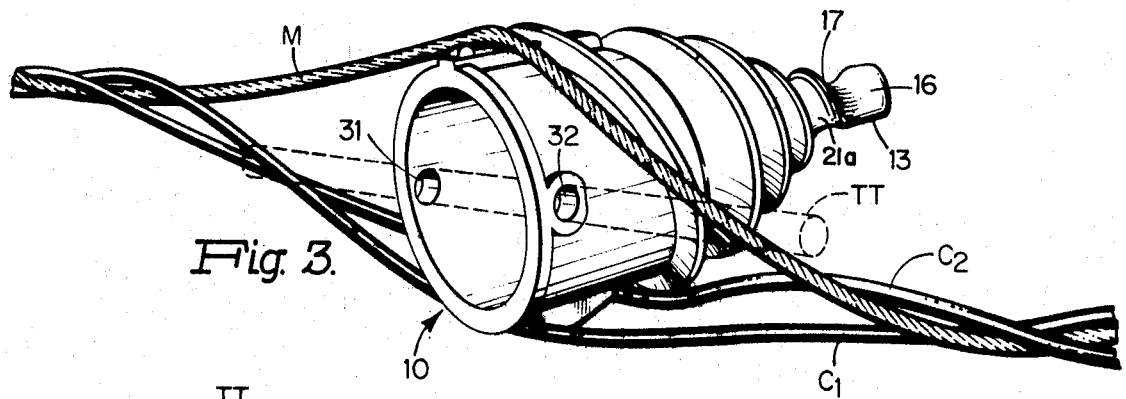
FIG. 3 shows the invention spreader after rotation to complete the spreading and holding apart of the cable wires.

Cable wire hold-apart portion 22 of the invention spreader is herein fitted for holding apart at one side the messenger M and at the opposite side two conductors, $C_1$, $C_2$ of a secondary cable, as shown, FIG. 3, with, at one side, a flat axial bar 23 projecting outwardly from the cylindrical wall 24 of the portion 22 and extending upwardly from congruence with a bottom rim or flange 23 thereon to the turn or length of thread crest 20 which defines at said base portion side the upper limit of cylindrical wall 24.

Thread 19 is seen to extend downwardly over the face of cylindrical wall 24 by said crest 20 passing or humping over said bar 23 at a thickening or projection 20a thereof, the same protruding over the bar 23 sufficiently to insure the confining therebelow of a cable wire wound below that turn of crest 20.

A nib or other detent 26 is formed on bar projection 23 at a point spaced below crest projection 20a, both to confine therewith a cable wire as wound over the bar 23, and to afford some latitude of vertical movement of the wire between the said confining projections 20a, 26.

Thread groove 21 is seen to widen or expand or spiral outwardly to the diameter of, or thereby to merge with, wall 24 at the other side of body 10, at root terminating, surface 24 recessing cleft 27, FIG. 1, leaving wires underlying the crest 20 at that point to extend therebeyond over the base portion surface proper 24.

Crest 20 continues one half turn beyond bar 23, spiraling down over the surface 24 to terminate at pyramidal or wedge shaped projection or plow 28 having axial wedge or cam faces 29, 30 sloping towards surface 24 from a transverse plow peak or ridge continuous thereat with crest 20, as that extends, as just mentioned, halfway around the body from flat bar 23.

For manual manipulating, or rotating with the aid of manually manipulable torque means, the body 10 has rotary levering support, lateral passage means or formations, herein the openings or opposite wall apertures 31, 32 in base portion 22 at the bottom of cylindrical wall 24 adjacent rim 25. To extend their bearing surfaces, as for firmer engagement by a screwdriver or other suitable torque tool by which the body 10 may be rotated, the apertures 31, 32 may comprise projections integrally thickening the base portion wall thereat, and which may project outwardly to the diameter or base flange 25, as shown.

In the operation and use of the described spreader in accordance with the invention method, the bill 11 is inserted from the side between the messenger M and one conductor wire $C_1$, and advanced therebetween until one of said wires M, $C_1$ is passed over the uppermost crest portion rib 17, and seated therebelow in uppermost root portion 21a.

The spreader tool is then rotated, by application of a screwdriver, bar, or other torque tool means TT to the apertures 31, 32, to advance the wires downwardly over the spiral thread 19, the wires being forced apart in that process by the flarent or divergent contouring or dimensioning of the thread crest 20 and root 21, as that advances down over the generally conical or dimensionally expanding contour of the spreader wedge section 18.

Figure 2:
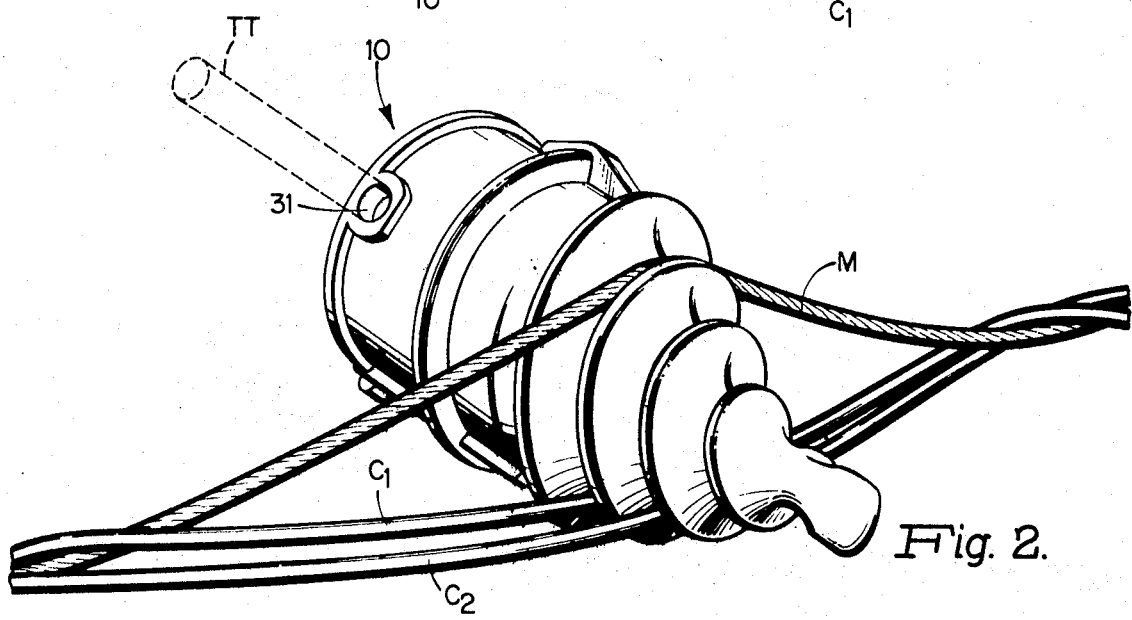
FIG. 2 shows the tool as inserted from the side betwen and separating secondary cable wires.

When the first phase conductor, $C_1$ has advanced at least to the second turn of thread root 21, the second phase conductor $C_2$ is positioned in the first or subsequent of said root turns, FIG. 2.

The spreader rotation is then continued until the cable wires are brought downwardly, or in other words the tool is advanced laterally, to the FIG. 3 position. In this the messenger wire M will be seen to engage over flat bar 23 through two rotations, in the first of which phase conductor $C_1$ is wound down below the lowermost turn of crest 20 to ride downwardly on plow surface 30 and base rim 25, and in the second of which the second phase conductor $C_2$ is advanced through terminal cleft 27 of root 21 to be confined on wall 24 between plow upper face 29 and the crest 20 segment projecting outwardly of the diameter of wall 24 thereat.

As well understood in the art, the invention spreader tool may be employed in conjunction or not with a conventional spreader device such as may be installed and left between the forced apart cable wires, freeing the tool for cable wire spreading re-use elsewhere.

With or without the employment subsequently or conjunctively of such a spreader device, the invention tool, in so forcing and holding apart the aerial cable messenger and conductor wires, facilitates their stripping and individually manipulating otherwise for the installation or attaching thereto of service taps, or customer drops, and with the service connections being makable at the pole or in the span between poles.

Whereas the FIG. 2 arrangement is common and preferable, within the invention the spreader tool hereof may be employed to force apart and hold separated the wires of any two or more wire secondary cable, and with the messenger and conductor wires in any wanted relative juxtaposition transversely and axially of the spreader.

I claim:

1. A spreader tool for separating the wound and and tensioned together messenger and conductor wires of aerial electric power cable to facilitate the individual manipulating of the wires as for installing cable separators therebetween or attaching service wires thereto, comprising:

means for entering the tool between any plurality of said wires;

means for forcing the wires apart upon rotation of the tool following its said entering therebetween, said forcing the wires apart means comprising a conical tool portion having formed thereon a spiral thread defined by a downwardly and outwardly winding crest and root; and means adapting the tool for its manual manipulating to effect said rotation as against the resistance thereto of said wound and tensioned together cable wires;

said means for entering the tool between any plurality of said wires comprising a blade having a blunt point, opposite, narrow, generally vertical edges, a generally vertical wide side, and opposite thereto a flaring wide side tapering from said blunt point divergently of said generally vertical side, said thread crest defining a transverse rib spiral-extending at its upper termination across said flaring blade side; and said thread root, at its upprmost turn, undercutting said transverse rib and defining, below said rib, the base of said generally vertical blade side;

whereby, when said point of said tool is inserted from the side between any two of said wires and is sufficiently advanced between them, a first of said wires will pass over said transverse rib and seat therebelow in said uppermost root turn at said flaring blade side while the second of said two wires passes down said generally vertical blade side to the base thereof below said transverse rib, and whereby the subsequent half-turn rotation of said tool advances said first wire down said conical tool portion to the next turn of said thread root at one side of said tool, advances said second wire in said uppermost root turn at the opposite side of said tool, and exposes said uppermost turn of said root for engagemnet therein of a third wire of said cable at said one side of said tool.

2. A spreader tool for separating the wound and tensioned together messenger and conductor wires of aerial electric power cable to facilitate the individual manipulating of the wires as for installing cable separators therebetween or attaching services wires thereto, comprising:

means for entering the tool between any plurality of said wires;

means for forcing the wires apart upon rotation of the tool following its said entering therebetween, said forcing the wires apart means comprising a conical tool portion having formed thereon a spiral thread defined by a downwardly and outwarding winding crest and root;

means for maintaining said wires forced apart while preventing their slipping off said tool, said means for maintaining said wires forced apart comprising a cylindrical tool portion depending from said conical portion, said cylindrical tool portion having a termination of said spiral thread intermediate the ends thereof said spiral thread termination serving to wind said cable wires downwardly to the therebelow portion of said cylindrical tool portion upon the sufficient rotation of said tool, and said cylindrical tool portion being hollow and thereby having opposite walls; and means adapting the tool for its manual manipulation to effect said rotation as against the resistance thereto of said wound and tensioned together cable wires, said means adapting said tool for said manual rotation comprising aligned apertures in said opposite walls of said cylindrical tool portion, said aligned apertures adapted to receive therethrough bar-like torque tool means that are manually manipulable to effect said spreader tool rotation.

3. The apparatus of claim 2, and detent menas projecting radially from the wall of said cylindrical tool portion, said detent means spaced below and confining wires wound below said spiral thread termination.

4. A spreader tool for separating the wound and tensioned together messenger and conductor wires of aerial electric power cable to facilitate the individual manipulating of the wires as for installing cable separators therebetween or attaching service wires thereto, comprising:

means for entering the tool between any plurality of said wires;

means for forcing the wires apart upon rotation of the tool following its said entering therebetween, said forcing the wires apart means comprising a conical tool portion having formed thereon a spiral thread defined by a downwardly and outwarding winding crest and root;

means adapting the tool for its manual manipulating to effect said rotation as against the resistance thereto of said wound and tensioned together cable wires;

means for maintaining said wires forced apart while preventing their slipping off said tool, said menas for maintaining said wires forced apart comprising a cylindrical tool portion depending from said conical portion and having thereon a terminatin of said spiral thread; and an annular base flange on said cylindrical tool portion, said flange adapted to confine between it and said crest of said thread such of said cable wires as are wound below said thread termination.

5. A spreader tool for separating the wound and tensioned together messenger and conductor wires of aerial electric power cable to facilitate the individual manipulating of the wires as for installng cable separators therebetween or attacing service wires thereto, comprising:

means for entering the tool between any plurality of said wires;

means for forcing the wires apart upon rotation of the tool following its said entering therebetween, said forcing the wires apart means comprising a conical tool portion having formed thereon a spiral thread defined by a downwardly and outwardly winding crest and root;

means adapting the tool for its manual manipulating to effect said rotation as against the resistance thereto of said wound and tensioned together cable wires;

means for maintaining said wires forced apart while preventing their slipping off said tool, said means for maintaining said wires forced apart comprising a cylindrical tool portion depending from said conical portion and having thereon a termination of said spiral thread; and a bar formed on said cylindrical tool portion, said bar intersecting said spiral thread on said portion at the spreader tool side opposite to that of said thread termination, the crest of said thread formed at said intersecting as a projection above said bar, and means forming a projection on said bar spaced below said crest projection and cooperating therewith to confine therebetween wires that are wound below said thread crest at and engaged over said bar.

6. A spreader tool for separating the wound and tensioned together messenger and conductor wires of aerial electric power cable to facilitate the individual manipulating of the wires as for installing cable separators therebetween or attaching service wires thereto, comprising:

means for entering the tool between any plurality of said wires;

means for forcing the wires apart upon rotation of the tool following its said entering therebetween, said forcing the wires apart means comprising a conical tool portion having formed thereon a spiral thread defined by a downwardly and outwardly winding crest and root;

means adapting the tool for its manual manipulating to effect said rotation as against the resistance thereto of said wound and tensioned together cable wires;

means for maintaining said wires forced apart while preventing their slipping off said tool, said means for maintaining said wires forced apart comprising a cylindrical tool portion depending from said conical portion and having thereon a termination of said spiral thread; and a wedge projection on said cylindrical tool portion at said termination of said spiral thread, said wedge projection spreading apart axially of said tool such of said cable wires as are successively engaged in said thread root and advanced by said tool rotation to positions above and below the lowermost turn of said crest of said spiral thread.

7. The apparatus of claim 6, wherein said wedge projection has camming faces sloping toward the surface of said cylindrical portion from a transverse wedge peak continuous with said crest termination.

* * * * *